United States Patent [19]
Cheetham

[11] 3,801,269
[45] Apr. 2, 1974

[54] EXHAUST DYING SYNTHETIC TEXTILE MATERIAL FROM AN AQUEOUS HALOGENATED HYDROCARBON BATH

[75] Inventor: Ian Cheetham, Manchester, England

[73] Assignee: Imperial Chemical Industries Limited, London, England

[22] Filed: Nov. 15, 1971

[21] Appl. No.: 198,959

[30] Foreign Application Priority Data
Dec. 8, 1970 Great Britain............... 58275/70

[52] U.S. Cl.................... 8/39, 8/174, 260/379, 260/380
[51] Int. Cl............................ D06p 1/20, D06p 3/54
[58] Field of Search.......... 8/39 B, 39 C, 39 R, 174; 260/379, 380

[56] References Cited
UNITED STATES PATENTS

| | | | |
|---|---|---|---|
| 3,510,243 | 5/1970 | Sewret et al. | 8/174 X |
| 2,819,275 | 1/1958 | Grossman | 260/380 |
| 3,195,973 | 7/1965 | Fichs et al. | 8/39 X |
| 3,617,174 | 11/1971 | Hohmann et al. | 8/39 |
| 2,182,963 | 12/1939 | Dreyfus et al. | 8/174 X |
| 2,384,001 | 9/1945 | Wesson | 8/40 |

FOREIGN PATENTS OR APPLICATIONS
6,710,789 3/1968 Netherlands............... 8/94

OTHER PUBLICATIONS
Color Index, Third Edition, Vol. 4, 1971, pp. 4532, 4535, 4538, 4540, 4550 and 4552.

Henkel and Cie English Translation of Netherlands Pat. No. 6,710,789, (3–1968), p. 11.

*Primary Examiner*—Leon D. Rosdol
*Assistant Examiner*—T. J. Herbert, Jr.
*Attorney, Agent, or Firm*—Cushman, Darby & Cushman

[57] ABSTRACT

Process for dyeing synthetic textile materials which comprises treating said textile materials with a solution or dispersion of an anthraquinone dyestuff free from sulphonic acid groups of the formula $$A-(NH - B - OH)_n$$

wherein B is an alkylene radical of from two to six carbon atoms which may be substituted by chlorine, bromine, or hydroxy, or B is an optionally substituted phenylene radical; $n$ is 1, 2, 3 or 4; and each of the — NH — B — OH groups is directly attached to a carbon atom which is in an α-position of the anthraquinone nucleus represented by A, and which may be further substituted by other than sulphonic acid groups, in a halogenated hydrocarbon and in the presence of a small amount of water, the said treatment being carried out at a temperature above the boiling point of the azeotrope of the halogenated hydrocarbon and the water, and at a pressure above atmospheric pressure, whereby heavy depths of shade can be obtained possessing excellent fastness properties.

7 Claims, No Drawings

EXHAUST DYING SYNTHETIC TEXTILE MATERIAL FROM AN AQUEOUS HALOGENATED HYDROCARBON BATH

This invention relates to an improved process for the dyeing of synthetic textile materials, especially polyamide, cellulose triacetate and aromatic polyester textile materials, and their blends with other textile materials.

It has previously been proposed to dye synthetic textile materials at elevated temperatures with solutions or dispersions of water-insoluble dyestuffs in a chlorinated hydrocarbon solvent, especially perchloroethylene, optionally containing small amounts of water, the said treatment being optionally carried out at pressures above atmospheric pressure. This process suffers from the disadvantage that the affinity of the said dyestuffs is low, so that only pale shades can be achieved by this process.

It has now been found that by using certain water-insoluble dyestuffs in the process deep shades can in fact be obtained.

According to the present invention there is provided an improved process for dyeing synthetic textile materials which comprises treating said textile materials with a solution or dispersion of an anthraquinone dyestuff free from sulphonic acid groups of the formula

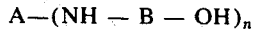

$$A-(NH - B - OH)_n$$

wherein B is an alkylene radical of from two to six carbon atoms which may be substituted by chlorine, bromine or hydroxy, or B is an optionally substituted phenylene radical; $n$ is 1,2,3 or 4; and each of the — NH — B — OH groups is directly attached to a carbon atom which is in an $\alpha$-position of the anthraquinone nucleus represented by A, and which may be further substituted by other than sulphonic acid groups, in a halogenated hydrocarbon and in the presence of a small amount of water, the said treatment being carried out at a temperature above the boiling point of the azeotrope of the halogenated hydrocarbon and the water, and at a pressure above atmospheric pressure.

The process of the invention can be conveniently carried out by immersing the textile material in a solution or dispersion of the said dyestuff in the halogenated hydrocarbon containing the necessary amount of water, which mixture is preferably contained in an autoclave or other pressure vessel, sealing the autoclave and thereafter heating it for a period which usually does not exceed 2 hours to a temperature above the boiling point of the azeotrope of the halogenated hydrocarbon and the water. At the conclusion of the process the dyed textile material may be rinsed with the halogenated hydrocarbon solvent to remove excess dyebath liquor and/or unfixed dyestuff, and the textile material is then dried. However, in order to remove unfixed dyestuff from the surface of the textile material, it is preferred to give the dyed textile material a treatment in a clearing bath comprising an emulsion of an aqueous alkaline solution of sodium hydrosulphite in perchloroethylene.

The amount of water used in the dyeing process is preferably between 0.2 and 5 percent by volume of the halogentated hydrocarbon.

Although the dyeing process is carried out at a temperature above the boiling point of the azeotrope of the halogenated hydrocarbon and the water, it is preferred that the temperature be equal to or greater than the boiling point of the pure halogenated hydrocarbon.

The halogenated hydrocarbons which can be used in the process of the invention either singly or in the form of mixtures are preferably halogenated aliphatic hydrocarbons containing from one to four carbon atoms, and as examples of such compounds there may be mentioned chloroform, carbon tetrachloride, dibromoethylene, trichloroethylene, 1:1:2-trichloro-1:2:2-trifluoroethane, 1:1:1-trichloroethane, and preferably tetrachloroethylene, (percloroethylene).

There can also be present emulsifying agents which can be anionic, cationic or non-ionic. Non-ionic emulsifying agents may be, for example, (a) polyethers of hydroxy, mercapto and amino compounds such as polyalkoxy-fatty alcohols, polyalkoxy polyols, polyalkoxymercaptans, polyalkoxy-aliphatic amines, polyalkoxyalkylphenols, polyalkoxy-naphthols, polyalkoxyalkylarylmercaptans and polyalkoxyarylamines (b) fatty acid esters of ethylene glycol, polyethyleneglycols, propylene glycols, butene glycols, glycerine, polyglycerine, pentaerythritol and sugar alcohols such as sorbitol, sorbitan and saccharose, (c) N-hydroxyalkylcarbonamides, polyalkoxy carbonamides and polyalkoxysulphonamides. Anionic emulsifying agents may be, for example, of the classes of alkylsulphonates, alkylarylsulphonates, alkylsulphates, aliphatic carboxylates and mono- or di-alkyl esters of phosphoric acid. Cationic surfactants may be for example quaternary ammonium salts. Specific examples of such classes of emulsifying agents are to be found in "Solubilisation by surface active agents" by Elworthy, Florence and Macfarlane, published by Chapman and Hall Ltd., in 1968.

As examples of the alkylene radicals represented by B which may optionally be substituted by chlorine, bromine or hydroxy there may be mentioned ethylene, trimethylene, propylene, tetramethylene, pentamethylene, hexamethylene and $\alpha:\beta$-dimethyl-ethylene.

As examples of the phenylene radicals represented by B there may be mentioned 1:3-phenylene, 1:4-phenylene, and these radicals can be substituted by chlorine, bromine, methyl or methoxy.

When B is an optionally substituted alkylene radical then $n$ preferably has a value of 2, whilst when B is an optionally substituted phenylene radical then $n$ is preferably 1.

As examples of further substituents on the anthraquinone nucleus represented by A there may be mentioned hydroxy, amino, nitro, lower alkylamino, lower alkoxy, anilino, chloroanilino, methylanilino and methoxyanilino in one or more of the $\alpha$-positions, and chlorine or bromine in one or more of the $\beta$-positions, of the anthraquinone nucleus.

Throughout this specification the terms lower alkyl and lower alkoxy are used to denote alkyl and alkoxy radicals respectively containing from one to four carbon atoms.

The said anthraquinone dyestuffs can be obtained by condensing the appropriate hydroxyanthraquinone of the formula $A-(OH)_n$ with an amine of the formula $H_2N - B - OH$.

The dispersion of the dyestuff in the halogenated hydrocarbon can be conveniently obtained by milling or grinding the dyestuff in the halogenated hydrocarbon in the presence of a deflocculating agent. As deflocculating agents there may be mentioned, for example, the agents used in British Pat. No. 1,108,261 and the polyureas described in U.S. application Ser. No. 63642, filed Aug. 13, 1970 now U.S. Pat. No. 3,728,301.

The synthetic textile materials which can be coloured by the process of the invention are preferably polyamides such as polyhexamethylene adipamide, cellulose triacetate and, above all, aromatic polyester textile materials. Such materials can be in the form of fibres or filaments or knitted or woven goods. If desired the said textile materials can be in the form of blends with other textile materials such as cotton and woollen textile materials.

When applied to synthetic textile materials by the process of the invention the said dyestuffs have excellent affinity thus enabling heavy depths of shades to be obtained, and the resulting dyed textile materials have excellent fastness to the tests commonly applied to such textile materials. The process of the invention also results in the production of level dyeings, and in this respect is superior to the dyeings obtained when the said dyestuffs are applied from aqueous dyebaths or from a halogenated hydrocarbon which does not contain any water.

The invention is illustrated but not limited by the following Examples in which the parts and percentages are by weight:

EXAMPLE 1

0.2 parts of 1:4-di($\beta$-hydroxethylamino)-5-hydroxyanthraquinone is dispersed by milling in 200 parts of perchloroethylene in the presence of 0.1 part, as deflocculating agent, of the polyurea product prepared as described in Example 2 of U.S. application Ser. No. 63642. Two parts of water are added, the mixture is placed in a dyeing vessel and 20 parts of polyethylene terephthalate textile material in the form of staple cloth is immersed in the mixture. The dyeing vessel is then sealed and heated at 120°C., for 30 minutes to effect dyeing. The dyed textile material is then removed from the pressure vessel, rinsed in perchloroethylene to remove the excess dyebath liquor, treated in an emulsion of an alkaline aqueous solution of sodium hydrosulphite and perchloroethylene to remove loosely bound dyestuff, and is finally rinsed in perchloroethylene and water and dried. The textile material is thereby coloured a deep turquoise shade of excellent fastness properties.

The 1:4-di($\beta$-hydroxyethylamino)-5-hydroxyanthraquinone was obtained by the condensation of 1:4:5-trihydroxyanthraquinone with an aqueous alkaline solution of monoethanolamine in the presence of a copper catalyst.

In place of the dyestuff used in the above example there can be used any of the dyestuffs listed in the second column of the following Table whereby the polyester textile material is dyed in the shades listed in the third column of the table.

| Example | Dyestuff | Shade |
| --- | --- | --- |
| 2 | 1-amino-4-($\beta$-hydroxyethylamino)anthraquinone | Blue |
| 3 | 1:4-di($\beta$-hydroxyethylamino)-5-aminoanthraquinone | Greenish-blue |
| 4 | 1:4-di($\beta$-hydroxyethylamino-5:8-dihydroxyanthraquinone | Bluish-green |
| 5 | 1:4-di($\alpha$-hydroxyethylamino)anthraquinone | Blue |
| 6 | 1:8-di($\beta$-hydroxyethylamino)anthraquinone | Rubine |
| 7 | 1:5-di($\beta$-hydroxyethylamino)-anthraquinone | Red |
| 8 | 1-(p-hydroxyanilino)-4-amino-5-nitro 8-hydroxyanthraquinone | Bluish-green |
| 9 | 1-amino-4-(p-hydroxyanilino) 5-nitro-8-hydroxyanthraquinone | – do – |
| 10 | 1:8-dihydroxy-4-(p-hydroxyanilino) 5-nitroanthraquinone | Greenish-blue |
| 11 | 1:4-di(p-hydroxyanilino)anthraquinone | Green |
| 12 | 1:8-di($\alpha$-hydroxypropylamino) anthraquinone | Rubine |
| 13 | 1-($\beta$-hydroxyethylamino)-4-($\beta$-hydroxy-$\gamma$-bromopropylamino)anthraquinone | Blue |
| 14 | 1:8-dihydroxy-4-(m-hydroxyanilino) 5-nitroanthraquinone | Greenish-blue |
| 15 | 1-(m-chloro-p-hydroxyanilino)-4-amino-5-nitro-8-hydroxyanthraquinone | Bluish-green |

EXAMPLE 16

In place of the 20 parts of the polyethylene terephthalate textile material in the form of staple cloth used in Example 1 there are used 20 parts of a textile material made by knitting a bulked polyethylene terephthalate yarn. A similar deep turquoise dyeing of excellent fastness properties is obtained.

EXAMPLE 17

200 parts of a polyamide staple yarn are wound on to a perforated spindle which is then placed in a circulating pressure dyeing machine. A dye liquor obtained by milling two parts of 1:4-di($\beta$-hydroxyethylamino)-5-hydroxyanthraquinone in 2,000 parts of perchloroethylene in the presence of one part of the polyurea obtained as described in Example 2 of U.S. application Ser. No. 63642 is then added to the dyeing machine followed by 20 parts of water and the machine is then closed. The temperature is then slowly raised to 105°C, and maintained at this temperature for 30 minutes, the dye liquor being continuously circulated in the machine. The dye liquor is then removed from the machine, fresh perchloroethylene added, and the yarn rinsed by circulating the perchloroethylene at 70°C. The yarn is then removed from the machine and dried. A deep blue dyeing of excellent fastness properties is obtained.

EXAMPLE 18

In place of the 20 parts of the polyethylene terephthalate textile material used in Example 1 there are used 20 parts of a polyhexamethylene adipamide textile material in the form of staple cloth, and the dyeing is effected at 100°C instead of 120°C as stated in Example 1. The so-dyed polyhexamethylene adipamide is then removed from the pressure vessel, rinsed in perchloroethylene and dried.

A deep turquoise dyeing of excellent fastness properties is obtained.

EXAMPLE 19

In place of the 20 parts of the polyethylene terephthalate textile material used in Example 1 there are used 20 parts of a cellulose triacetate textile material in the form of woven cloth. Dyeing is then carried out at 95°C instead of the 120°C stated in Example 1.

A deep turquoise dyeing of excellent fastness properties is obtained.

EXAMPLE 20

In place of the 200 parts of perchloroethylene used in Example 1 there are used 200 parts of 1:1:1-trichloroethane, whereby a similar result is obtained.

EXAMPLE 21

The process of Example 1 is repeated except that the dye-bath additionally contains 0.4 parts of isopropyl ammonium dodecyl benzene sulphonate as an emulsifying agent.

A similar deep turquoise dyeing is obtained.

I claim:

1. Process for dyeing synthetic textile material selected from aromatic polyester, cellulose triacetate and polyamide textile material and blends thereof which comprises treating said textile material with a solution or dispersion of an anthraquinone dyestuff free from sulphonic acid groups of the formula $$A-(NH - B - OH)_n$$

wherein B is an alkylene radical of from two to six carbon atoms which may be substituted by chlorine, bromine or hydroxy, or B is an optionally substituted phenylene radical; $n$ is 1, 2, 3 or 4; and each of the —NH — B — OH groups is directly attached to a carbon atom which is in an $\alpha$-position of the anthraquinone nucleus represented by A, and which may be further substituted by other than sulphonic acid groups, in a mixture consisting essentially of a halogenated hydrocarbon and water present in amounts of 0.2–5 percent by volume of said halogenated hydrocarbon, the said treatment being carried out at a temperature equal to or above the boiling point of the halogenated hydrocarbon, and at a pressure above atmospheric pressure.

2. Process as claimed in claim 1 wherein the halogenated hydrocarbon is a halogenated aliphatic hydrocarbon containing from one to four carbon atoms.

3. Process as claimed in claim 1 wherein the halogenated hydrocarbon is perchloroethylene.

4. Process as claimed in claim 1 wherein the solution or dispersion of the dyestuff in the halogenated hydrocarbon additionally contains a deflocculating agent.

5. Process as claimed in claim 1 wherein the solution or dispersion of the dyestuff in the halogenated hydrocarbon also contains an emulsifying agent.

6. Process as claimed in claim 1 wherein B is an optionally substituted alkylene radical and $n$ is 2.

7. Process as claimed in claim 1 wherein B is an optionally substituted phenylene radical and $n$ is 1.

* * * * *